US008127115B2

United States Patent
Doing et al.

(10) Patent No.: US 8,127,115 B2
(45) Date of Patent: Feb. 28, 2012

(54) GROUP FORMATION WITH MULTIPLE TAKEN BRANCHES PER GROUP

(75) Inventors: Richard William Doing, Raleigh, NC (US); Kevin Neal Magil, Raleigh, NC (US); Balaram Sinharoy, Poughkeepsie, NY (US); Jeffrey R. Summers, Raleigh, NC (US); James Albert Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/417,798

(22) Filed: Apr. 3, 2009

(65) Prior Publication Data

US 2010/0257340 A1    Oct. 7, 2010

(51) Int. Cl.
*G06F 9/30* (2006.01)
(52) U.S. Cl. ............ 712/215; 712/24; 712/214; 712/234
(58) Field of Classification Search .................... 712/23, 712/24, 214, 215, 216, 219, 234
See application file for complete search history.

(56) References Cited

U.S. PATENT DOCUMENTS

| | | | | |
|---|---|---|---|---|
| 5,560,028 A * | 9/1996 | Sachs et al. | ...................... | 712/23 |
| 5,809,324 A * | 9/1998 | Yung | ............................... | 712/23 |
| 5,819,058 A * | 10/1998 | Miller et al. | .................... | 712/210 |
| 5,822,559 A * | 10/1998 | Narayan et al. | ............... | 712/214 |
| 5,913,049 A * | 6/1999 | Shiell et al. | .................... | 712/215 |
| 5,918,005 A * | 6/1999 | Moreno et al. | ............... | 714/38.1 |
| 5,991,869 A * | 11/1999 | Tran et al. | ...................... | 712/204 |
| 6,272,624 B1 | 8/2001 | Giacalone et al. | | |
| 6,360,313 B1 * | 3/2002 | Sachs et al. | ................... | 712/215 |
| 6,691,221 B2 | 2/2004 | Joshi et al. | | |
| 6,877,089 B2 * | 4/2005 | Sinharoy | ........................ | 712/239 |
| 7,085,920 B2 | 8/2006 | Yoshimi | | |
| 7,096,348 B2 | 8/2006 | Moyer et al. | | |
| 7,237,094 B2 | 6/2007 | Curran et al. | | |
| 7,269,715 B2 | 9/2007 | Le et al. | | |
| 7,437,543 B2 * | 10/2008 | Doing et al. | ................... | 712/240 |
| 7,577,827 B2 * | 8/2009 | Hoogerbrugge | ............... | 712/239 |
| 7,836,287 B2 * | 11/2010 | Doing et al. | ................... | 712/238 |
| 7,870,368 B2 * | 1/2011 | Luick | ............................. | 712/216 |
| 7,941,654 B2 * | 5/2011 | Luick | ............................. | 712/240 |

(Continued)

OTHER PUBLICATIONS

Kalla, IBM's Micro Processor Design and Methodology, IBM Systems and Technology Group, IBM Corp, 2003.

(Continued)

*Primary Examiner* — Aimee Li
(74) *Attorney, Agent, or Firm* — Yudell Isidore Ng Russell PLLC

(57) ABSTRACT

Disclosed are a method and a system for grouping processor instructions for execution by a processor, where the group of processor instructions includes at least two branch processor instructions. In one or more embodiments, an instruction buffer can decouple an instruction fetch operation from an instruction decode operation by storing fetched processor instructions in the instruction buffer until the fetched processor instructions are ready to be decoded. Group formation can involve removing processor instructions from the instruction buffer and routing the processor instruction to latches that convey the processor instructions to decoders. Processor instructions that are removed from instruction buffer in a single clock cycle can be called a group of processor instructions. In one or more embodiments, the first instruction in the group must be the oldest instruction in the instruction buffer and instructions must be removed from the instruction buffer ordered from oldest to youngest.

30 Claims, 10 Drawing Sheets

U.S. PATENT DOCUMENTS

| | | |
|---|---|---|
| 7,984,276 B2 * | 7/2011 | Busaba et al. ............... 712/226 |
| 2001/0037444 A1 | 11/2001 | Munson et al. |
| 2004/0230773 A1 | 11/2004 | Busaba et al. |
| 2005/0268075 A1 | 12/2005 | Caprioli et al. |
| 2006/0184768 A1 | 8/2006 | Bishop et al. |
| 2009/0063818 A1 * | 3/2009 | Gschwind et al. ............ 712/204 |
| 2009/0210665 A1 * | 8/2009 | Bradford et al. .............. 712/215 |
| 2009/0210668 A1 * | 8/2009 | Luick ............................ 712/216 |
| 2009/0210674 A1 * | 8/2009 | Luick ............................ 712/216 |

OTHER PUBLICATIONS

Le et al., IBM Power6 Microarchitecture, IBM Journal of Research and Development, http://www.research.ibm.com/journal/rd/516/le.html, 2007.

* cited by examiner

GROUP FORMATION WITH MULTIPLE TAKEN BRANCHES PER GROUP

BACKGROUND

1. Technical Field

The present invention generally relates to formation of groups of processor instructions. More specifically, the present invention relates to formation of processor instruction groups that can include multiple branch processor instructions per group of processor instructions.

2. Description of the Related Art

Throughput of a superscalar processor is affected by a number of processor instructions (e.g., a group of processor instructions) that are accepted in a clock cycle. FIG. 1 illustrates a prior art instruction decode unit that receives multiple processor instructions and forms multiple groups of processor instructions. As shown, a prior art instruction decode unit 100 includes an instruction buffer 110, a group formation unit 130, slots 140S0-140S4 (e.g., latches or registers) and decoders 140D0-140D4. Instruction buffer 110 includes buffer entries 120B0-120B31 where each of buffer entries 120B0-120B31 can store a processor instruction, and instruction buffer 110 stores sequential instructions from an instruction cache in buffer entries 120B0-120B31.

Group formation unit 130 forms groups of processor instructions stored in instruction buffer 110 and routes the groups of processor instructions to slots 140S0-140S4. A group of processor instructions is a set of processor instructions that are decoded and dispatched to one or more issues queues, where each of the set of processor instructions is executed independently, or possibly out of order, and completed together. The group of processor instructions is completed together such that a data flow of a sequence of processor instructions that includes the group of processor instructions is unchanged.

In prior art instruction decode unit 100, group formation unit 130 routes non-branch processor instructions to non-branch instruction slots 140S0-140S3 and a branch processor instruction of the processor instruction group to branch slot 140S4. As such, only one branch processor instruction is possible per processor instruction group. Moreover, when decode unit 100 encounters a predicted taken branch instruction, a new cache line of the instruction cache is accessed and placed in a new instruction buffer row (e.g., a row including entries 120B4-120B7). However, decode unit 100 operating in this fashion introduces "holes" or "gaps" in instruction buffer 110 between the predicted taken branch and the target of the branch. These "holes" or "gaps" must be ignored when determining a next instruction to include in a group. Thus, throughput of a superscalar processor is limited in the prior art.

SUMMARY

Disclosed are a method and a system for grouping processor instructions for execution by a processor, where the group of processor instructions includes at least two branch processor instructions. In one or more embodiments, an instruction buffer can decouple an instruction fetch function or operation from an instruction decode function or operation by storing fetched processor instructions, from an instruction cache, until the fetched processor instructions are ready to be decoded. Group formation can involve removing processor instructions from the instruction buffer and routing the processor instruction to slots (e.g., latches or registers) that convey the processor instructions to decoders which can decode the processor instructions and can convey decode information to one or more instruction issue queues. Processor instructions that are removed from instruction buffer in a single clock cycle can be called a group of processor instructions. In one or more embodiments, the first instruction in the group must be the oldest instruction in the instruction buffer and instructions must be removed from the instruction buffer ordered from oldest to youngest.

BRIEF DESCRIPTION OF TILE DRAWINGS

The invention itself, as well as advantages thereof, will best be understood by reference to the following detailed description of an illustrative embodiment when read in conjunction with the accompanying drawings, wherein:

FIG. 1 provides a block diagram FIG. 1 illustrates a prior art instruction decode unit that receives multiple processor instructions and forms multiple groups of processor instructions;

Figure 6:
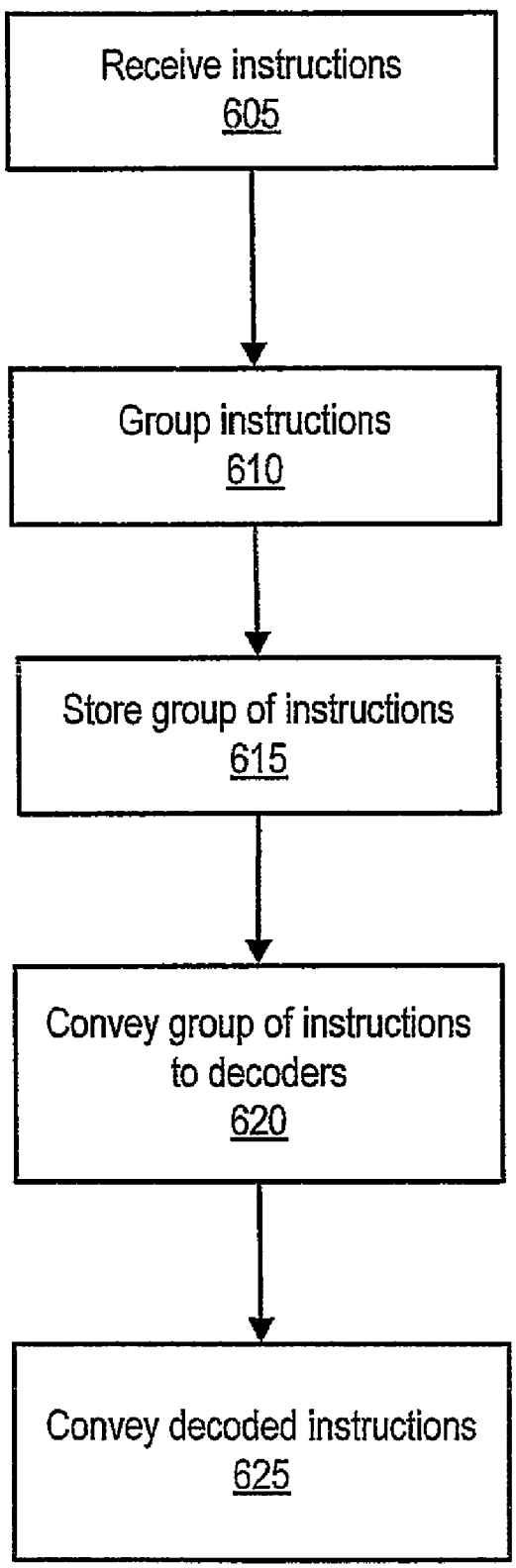
Figure 7:
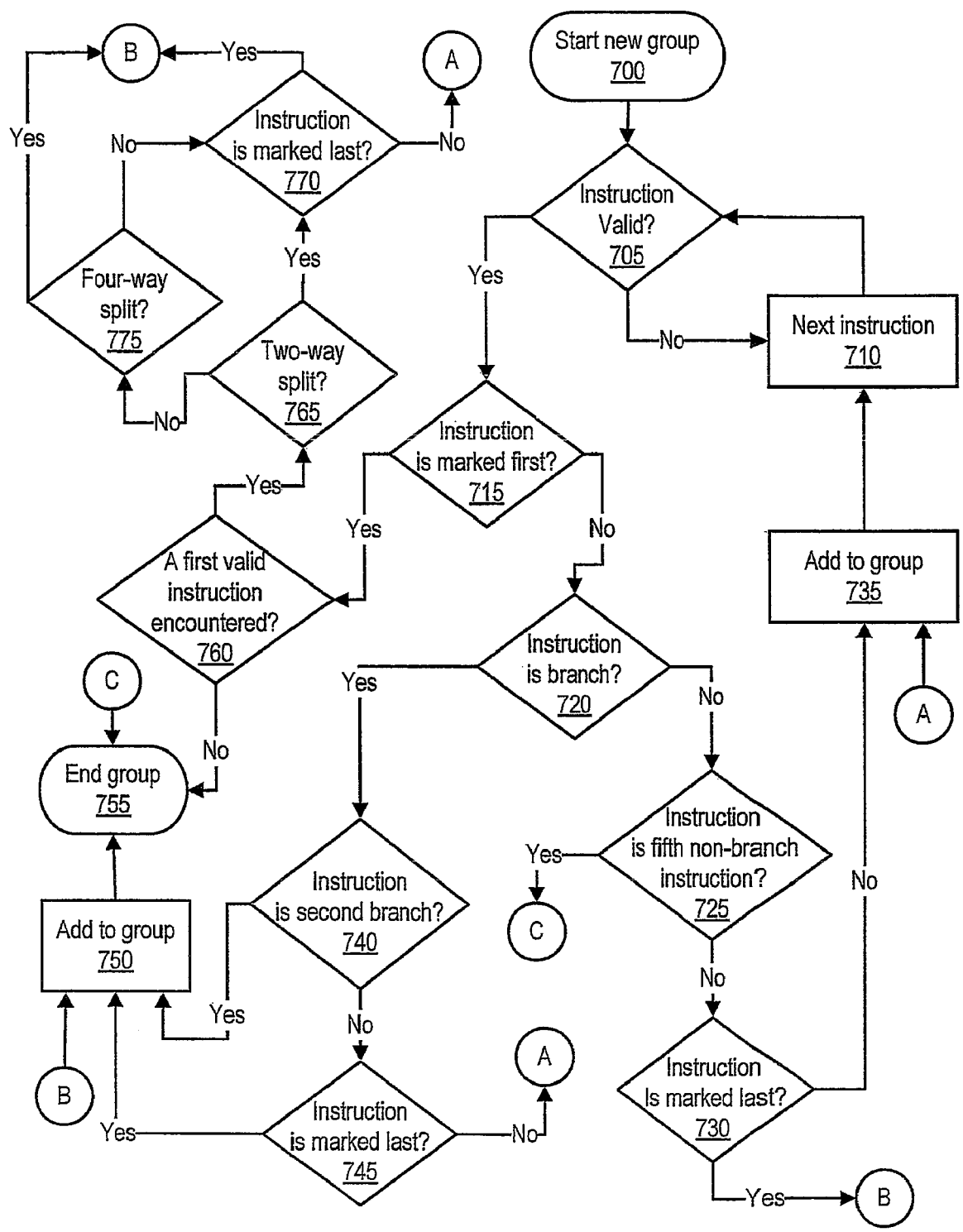
Figure 8:
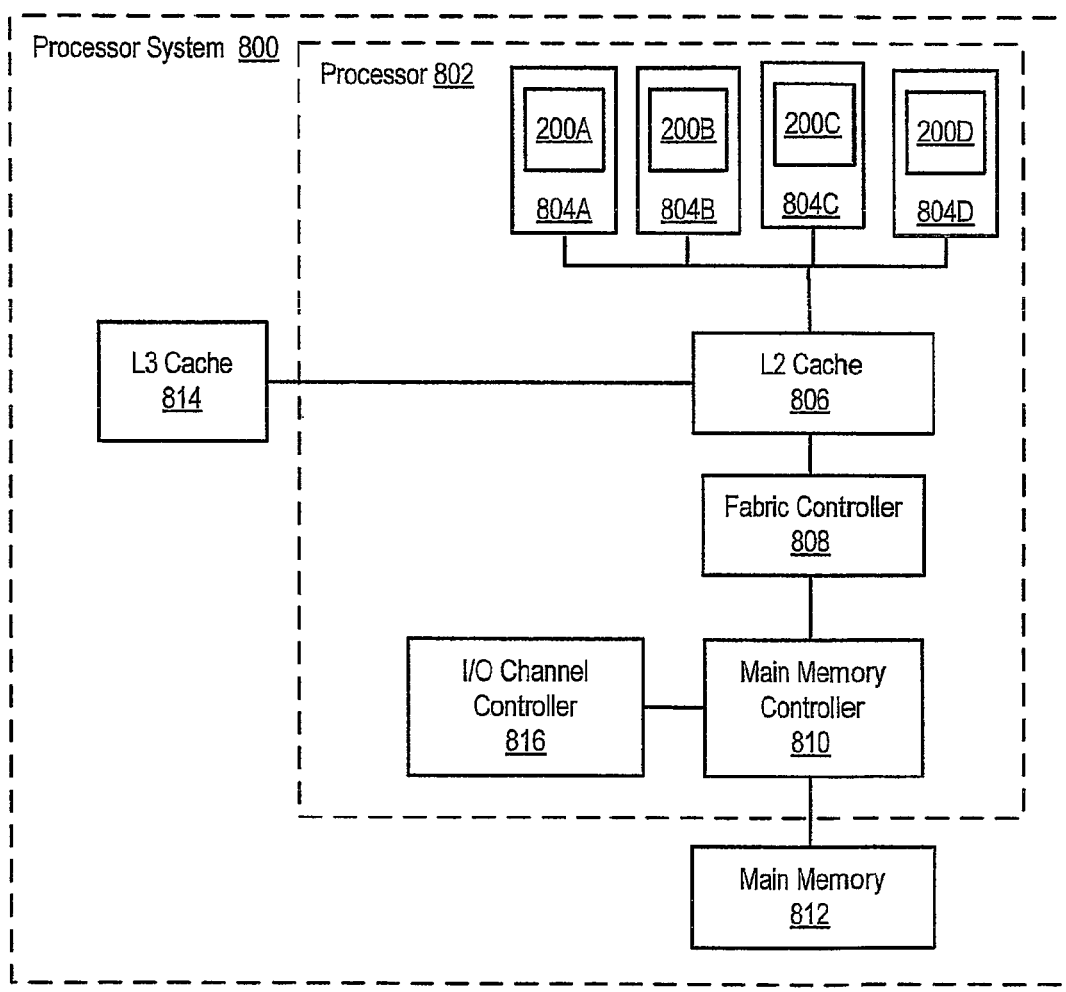

FIGS. 5A-5F, there are depicted block diagrams that provides further detail of buffer entries coupled to multiplexors which are coupled to slots of an instruction decode unit, according to one or more embodiments;

FIG. 6 illustrates a method for operating an instruction decode unit, according to one or more embodiments;

FIG. 7 illustrates a method that provides further details for operating an instruction decode unit is illustrated, according to one or more embodiments; and FIG. 8 illustrates a block diagram representation of a processor system, according to one or more embodiments.

DETAILED DESCRIPTION

Disclosed are a method and a system for grouping processor instructions for execution by a processor, where the group of processor instructions includes at least two branch processor instructions. In one or more embodiments, an instruction buffer can decouple an instruction fetch function or operation from an instruction decode function or operation by storing fetched processor instructions, from an instruction cache, until the fetched processor instructions are ready to be decoded. Group formation can involve removing processor instructions from the instruction buffer and routing the processor instruction to slots (e.g., latches or registers) that convey the processor instructions to decoders which can decode the processor instructions and can convey decode information to one or more instruction issue queues. As used herein, to convey information can mean to transmit information. In one or more embodiments, pre-decode data is associated with the fetched processor instructions, and grouping and/or routing the processor instructions is based on the pre-decode data. Processor instructions that are removed from instruction buffer in a single clock cycle can be called a group of processor instructions. In one or more embodiments, the first instruction in the group must be the oldest instruction in the instruction buffer and instructions must be removed from the instruction buffer ordered from oldest to youngest. In one or more embodiments, a group of processor instruction can be concluded after adding and/or routing a first branch processor instruction and a second branch processor instruction to the group of processor instructions.

Figure 1:
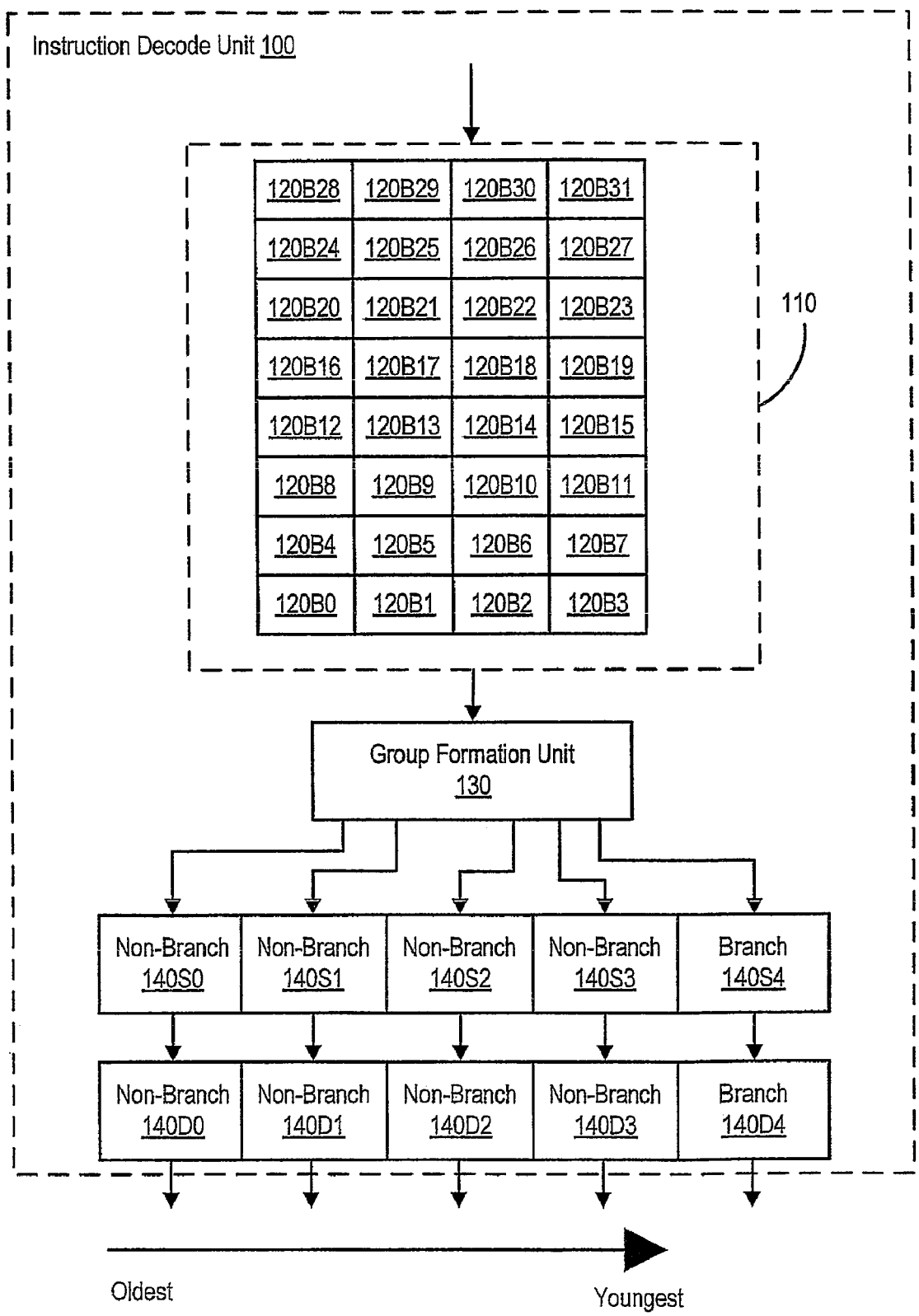
Figure 2:
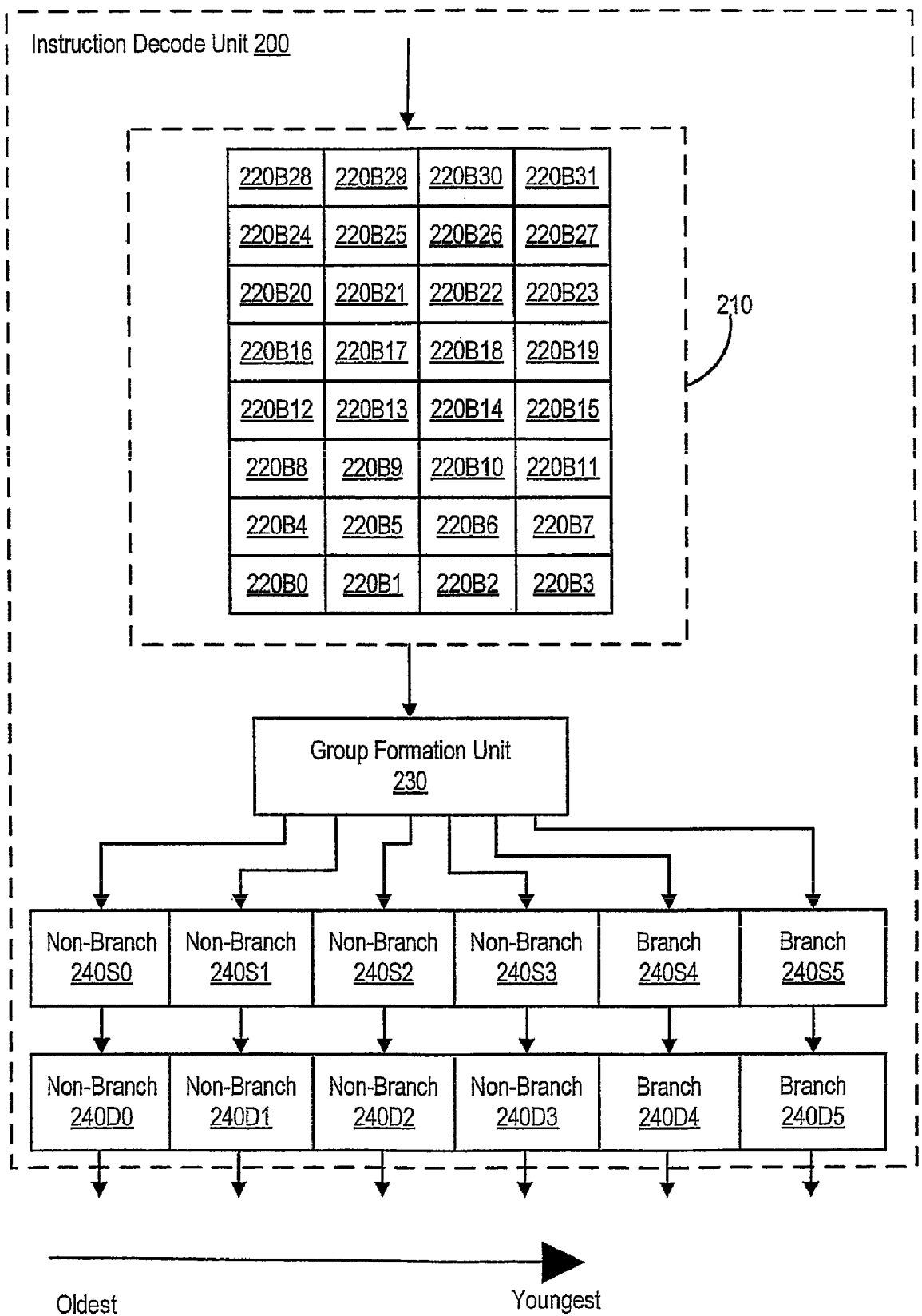
FIG. 2 illustrates a block diagram of an instruction decode unit, according to one or more embodiments.

With reference now to FIG. 2, there is depicted a block diagram of an instruction decode unit, according to one or more embodiments. As shown, an instruction decode unit 200 includes an instruction buffer 210 coupled to a group formation unit 230 coupled to slots 240S0-240S5 coupled to respective decoders 240D0-240D5. Instruction buffer 210 can include buffer entries 220B0-220B31, and each of entries 220B0-220B31 can store and convey a processor instruction. For example, entries 220B0-220B31 can store processor instructions from an instruction cache and convey processor instructions to group formation unit 230. In one or more embodiments, instruction buffer 210 can be implemented similar to or as a register file.

Slots 240S0-240S3 can receive, store, and convey non-branch processor instructions, and slots 240S4 and 240S5 can receive, store, and convey branch processor instructions. In one or more embodiments, slots 240S0-240S5 can be implemented as latches or registers. Decoders 240D0-240D3 can decode non-branch processor instructions from respective slots 240S0-240S3, and decoders 240D4 and 240D5 can decode branch processor instructions from respective slots 240S4 and 240S5. In one or more embodiments, decoders 240D0-240D5 can be implemented with combinational logic.

Group formation unit 230 can populate slots 240S0-240S3 by starting at and storing non-branch processor instructions at slot 240S0 and continues to store non-branch processor instructions towards slot 240S3. Thus, the "oldest" non-branch processor instruction resides in slot 240S0, a "newer" or "younger" processor instruction can reside in slot 240S1, and so on. In other words, non-branch processor instructions can be sequenced or ordered such that a first processor instruction in a sequence placed in slot 240S0 can be considered the "oldest" non-branch processor instruction such that a subsequent or second non-branch processor instruction of the sequence placed in slot 240S1 can be considered the a "newer" instruction. Group formation unit 230 can populate slots 240S4 and 240S5 by storing a first encountered branch processor instruction, in an instruction sequence, in slot 240S4 and a second encountered branch processor instruction, in the instruction sequence, in slot 240S5.

Group formation unit 230 forms groups of processor instructions stored in instruction buffer 210 and routes the groups of processor instructions to slots 240S0-240S5. A group of processor instructions is a set of processor instructions that are decoded and dispatched to one or more issues queues, where each of the set of processor instructions is executed independently, or possibly out of order, and completed together. The group of processor instructions is completed together such that a data flow of a sequence of processor instructions that includes the group of processor instructions is unchanged.

Figure 3:
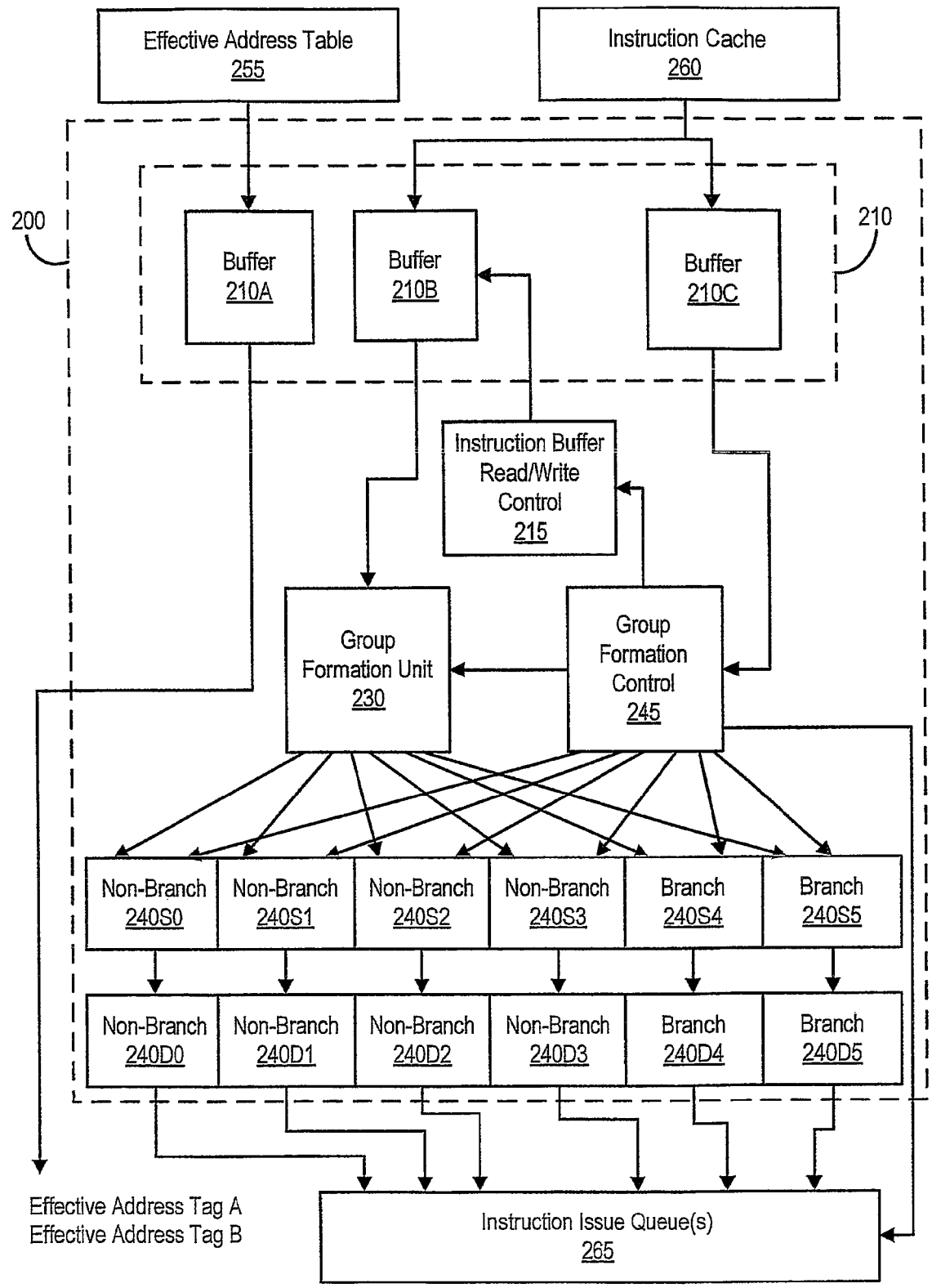
FIG. 3 illustrates a block diagram that provides further detail of an instruction decode unit, according to one or more embodiments.

With reference now to FIG. 3, there is depicted a block diagram that provides further detail of instruction decode unit 200, according to one or more embodiments. As shown, instruction decode unit 200 can be coupled to an effective address table 255, an instruction cache 260 (e.g., a level one cache), and one or more instruction issue queues 265. Instruction decode unit 200 can also be coupled to a global completion table (not shown). As shown, instruction buffer 210 includes buffers 210A-210C. Buffer 210A can be coupled to effective address table 255 and can receive effective address tags that are associated with effective addresses.

In one or more embodiments, effective address table 255 can include a data structure that includes tuples. For example, a first component of a first tuple can include an effective address tag (e.g., an effective address tag A), and a second component of the first tuple that includes an effective address. For instance, the effective address tag can be used to index into the data structure of effective address table 255 to determine and/or retrieve the effective address associated with the effective address tag. In one or more embodiments, the effective address tag can have a bit count less than a bit count of the effective address. In one or more embodiments, effective address tag A is associated first (oldest) instruction in a processor instruction group, and an effective address tag B is associated with target taken branch instruction. Effective address tag B can be marked as invalid as one or more groups are formed and/or processed, in one or more instances.

As shown, buffers 210B and 210C can be coupled to instruction cache 260. Buffer 210B can receive processor instruction data from instruction cache 260 and can store the processor instruction data in buffer entries (e.g., buffer entries 220B0-220B31) of buffer 210B. In one or more embodiments, data entering buffer 210B is right-aligned. Buffer 260C can receive and store pre-decode data from instruction cache 260. In one or more embodiments, buffer 260C can include a queue where the pre-code data is stored. As shown, buffer 210B is coupled to an instruction a buffer read/write control 215 and a group formation unit 230, and buffer 210C is coupled to a group formation control 245.

In one or more embodiments, buffer read/write control 215 manages writes and reads of data in and out of buffer 210B. For example, buffer read/write control 215 tracks and directs where next available entries of entries 220B0-220B31 are able to store incoming processor instructions and which entries of entries 220B0-220B31 to read the oldest entries of entries 220B0-220B31 can be used to convey processor instructions to group formation unit 230. As group formation control 245 determines which instructions are placed into a group, group formation control 245 conveys information to buffer read/write control 215 of how many instructions are removed from buffer 210B, and buffer read/write control 215 adjusts one or more pointers (e.g., read and/or write points) appropriately. In one or more embodiments, buffer 210B can be implemented as or similar to a register file.

Group formation control 245 is coupled to group formation unit 230, instruction buffer read/write control 215, and one or more instruction issue queues 265. Each of group formation unit 230 and group formation control 245 is coupled to slots 240S0-240S5, and slots 240S0-240S5 are coupled to respective decoders 240D0-240D5, as shown. Decoders 240D0-240D5 can be coupled to one or more instruction issue queues 265.

In one or more embodiments, group formation control 245 issues one or more instruction valid bits to slots 240S0-240S5 and one or more instruction issue queues 265. The instruction valid bits may be used in clock gating slots 240S0-240S5, and one or more instruction issue queues 265 can use the instruction valid bits to determine if information from one or more decoders is valid. For example, slot 240S1 may receive a non-valid bit from group formation control 245 and a processor instruction from group formation unit 230. The non-valid bit from group formation control 245 can be used to clock gate slot 240S1, and decoder 240D1 receives a previous processor instruction from slot 240S1, where previous is relative to an instruction sequence and a clock signal. One or more instruction issue queues 265 can also receive the non-valid bit from group formation control 245 and can use the non-valid bit to determine the validity of the information from decoder 240D1. In one or more embodiments, clock gating a slot (e.g., a slot of slots 240S0-240S5) can include not conveying a clock signal to the slot for one or more periods of time while other portions of instruction decode unit 200 are in operation. For instance, clock gating can be used to conserve power, which power consumption can be a factor in designing and/or implementing processors.

Figure 4:
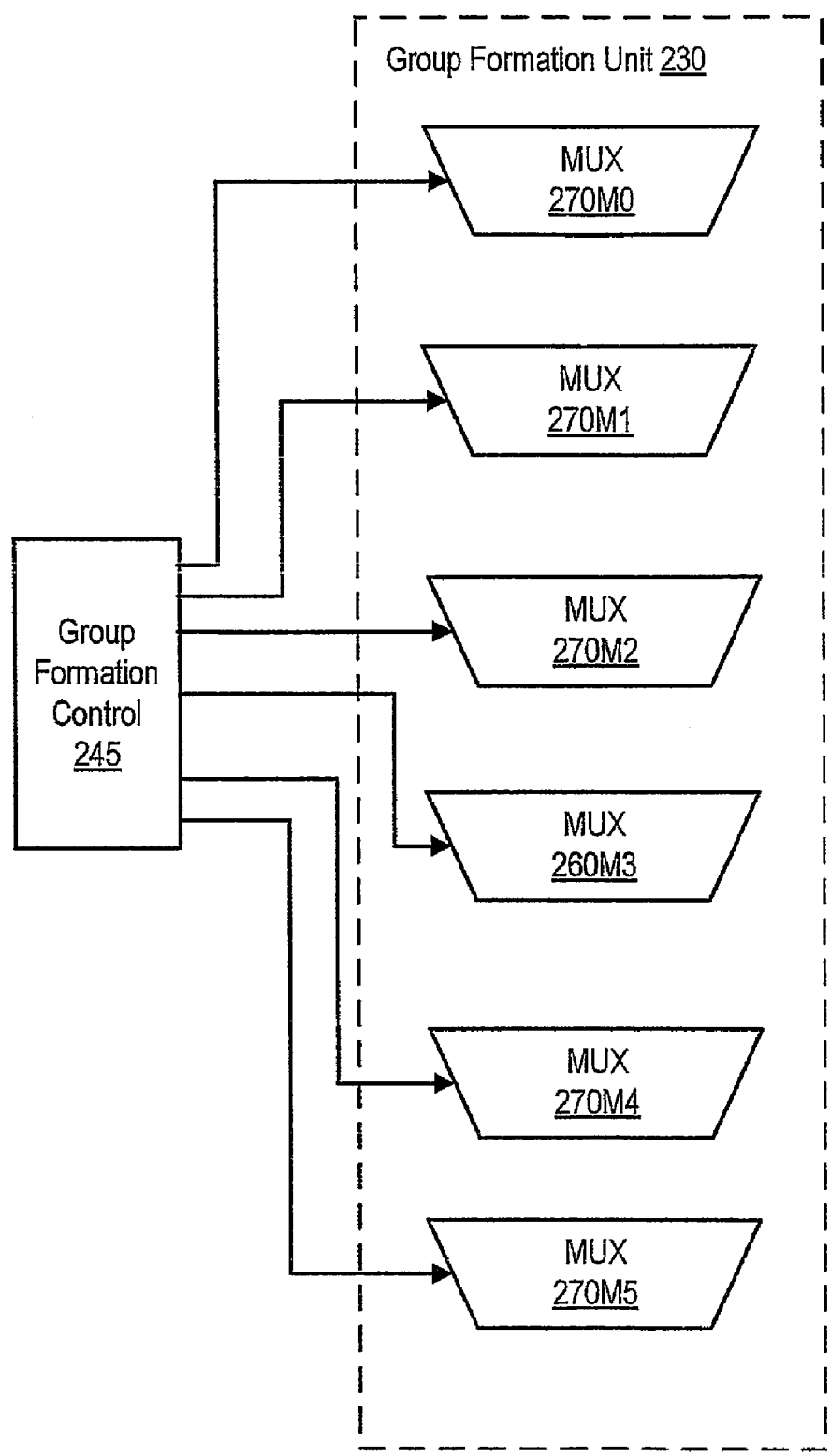
FIG. 4 illustrates a block diagram that provides further detail of a group formation control and a group formation unit, according to one or more embodiments.

With reference now to FIG. 4, there is depicted a block diagram that provides further detail of group formation control 245 and group formation unit 230, according to one or more embodiments. As shown, group formation unit can include one or more multiplexers (MUXes) 270M0-270M5. Group formation control 245 is coupled to MUXes 270M0-270M5 and conveys control information to each of MUXes 270M0-270M5 to select a processor instruction from instruction buffer 210B to be conveyed to a slot, as described in further detail below.

Figure 5A:
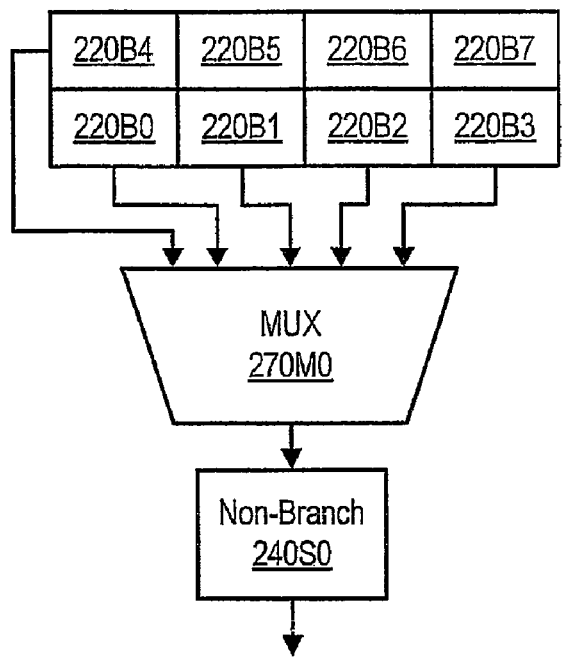
Figure 5B:
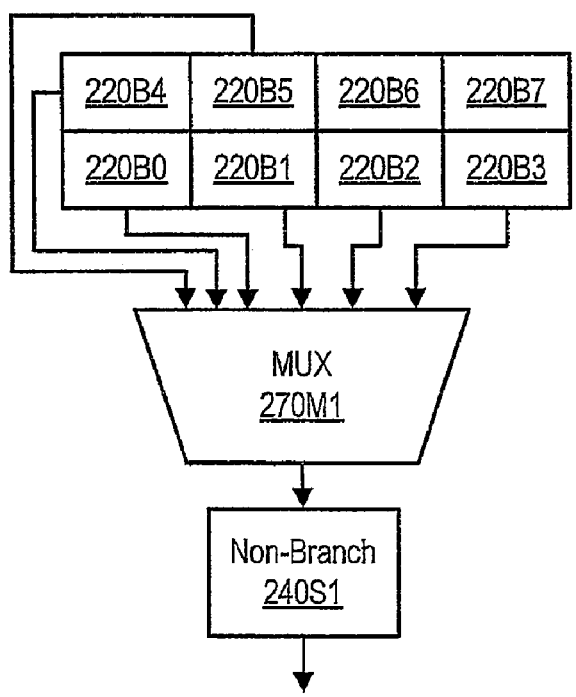
Figure 5C:
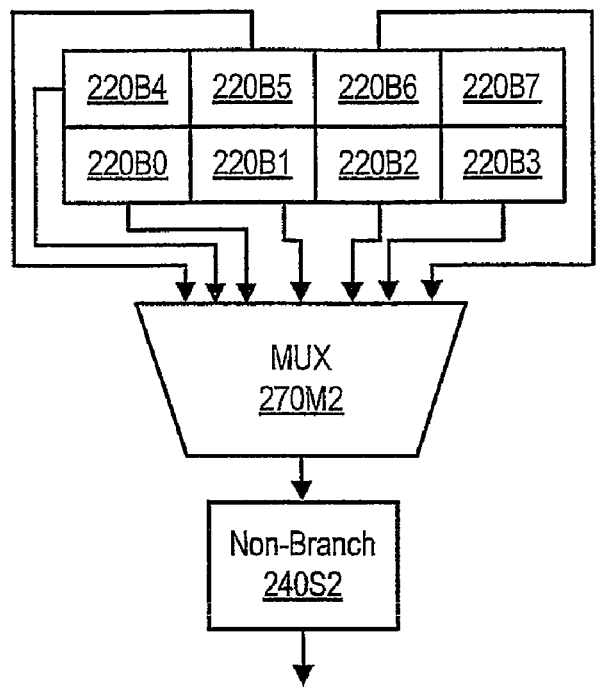
Figure 5D:
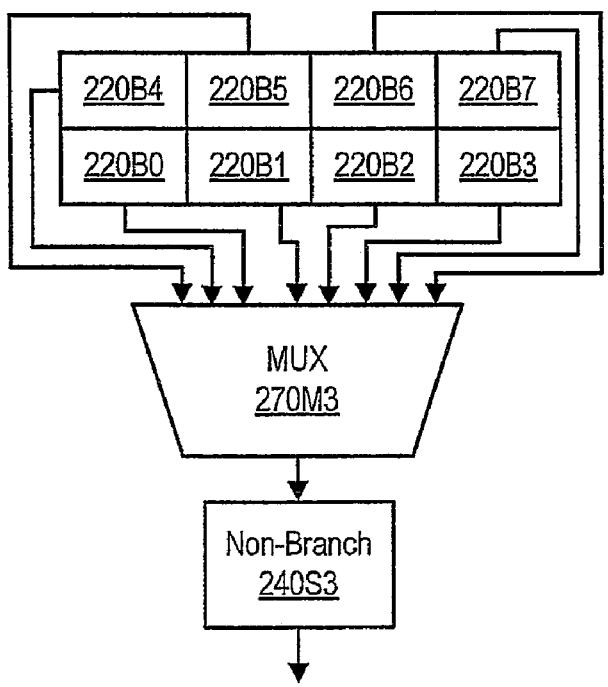
Figure 5E:
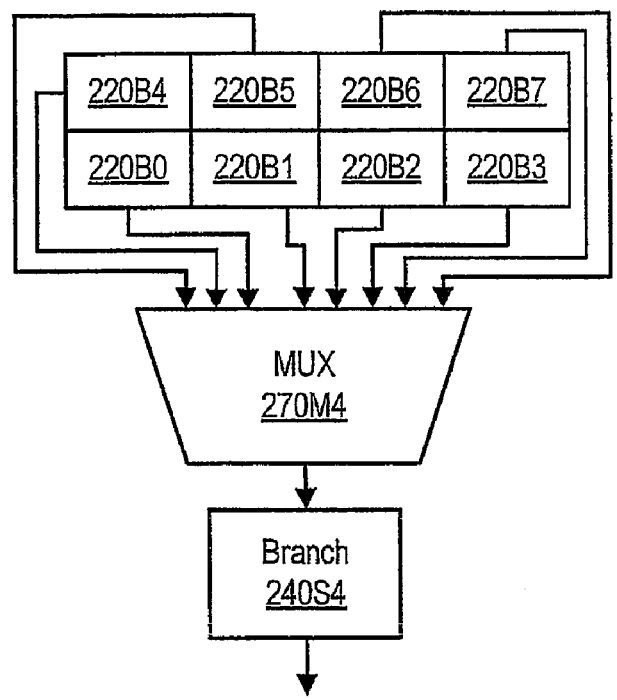
Figure 5F:
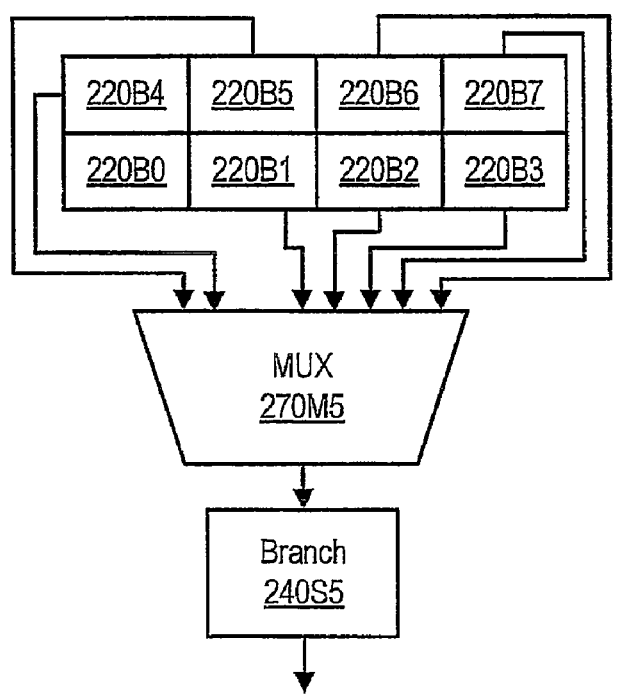

With reference now to FIGS. 5A-5F, there are depicted block diagrams that provides further detail of buffer entries 220B0-220B7, MUXes 270M0-270M5, and slots 240S0-240S5, according to one or more embodiments. As shown in FIG. 5A, buffer entries 220B0-220B4 are coupled to multiplexer (MUX) 270M0, and MUX 270M0 is coupled to non-branch slot 240S0. As shown in FIG. 5B, buffer entries 220B0-220B5 are coupled to MUX 270M1, and MUX 270M1 is coupled to non-branch slot 240S1. As shown in FIG. 5C, buffer entries 220B0-220B6 are coupled to MUX 270M2, and MUX 270M2 is coupled to non-branch slot 240S2. As shown in FIG. 5D, buffer entries 220B0-220B7 are coupled to MUX 270M3, and MUX 270M3 is coupled to non-branch slot 240S3. As shown in FIG. 5E, buffer entries 220B0-220B7 are coupled to MUX 270M4, and MUX 270M4 is coupled to branch slot 240S4. As shown in FIG. 5F, buffer entries 220B1-220B7 are coupled to MUX 270M5, and MUX 270M5 is coupled to branch slot 240S5.

In one example with reference to FIGS. 5A and 5E, group formation unit 230 accesses instruction buffer entries 220B0-220B4 to route a first non-branch instruction in a group of processor instructions to slot 240S0 using MUX 270M0. A first valid processor instruction could be in one of buffer entries 220B0-220B3, since, in one or more embodiments, data entering instruction buffer 210 is right-aligned. Buffer entry 220B4 can also be accessed for a case where the first valid instruction is a not-taken branch processor instruction is stored in buffer entry 220B3. The branch processor instruction is routed to slot 240S4 by MUX 270M4 and the processor instruction stored in buffer entry 220B4 is routed to slot 240S0 by MUX 270M0.

In a second example with reference to FIGS. 5A-5F, if a predicted taken branch processor instruction is stored in one of buffer entries 220B0-220B2, any processor instruction stored in buffer entries 220B1-220B3 subsequent to the buffer entry that stores the taken branch processor instruction is invalidated. For instance, if the predicted taken branch processor instruction is stored in buffer entry 220B1, processor instructions stored in buffer entries 220B2 and 220B3 are invalidated. Buffer entries 220B4-220B7 can begin with invalid instructions depending on a fetch address of a target of the predicted taken branch processor instruction that is stored in one of buffer entries 220B0-220B3. The branch processor instruction can be routed to slot 240S4 while non-branch instructions prior (older) and subsequent (younger) to the branch processor instruction are routed to slots 240S0-240S3 in age-order, and a second branch processor instruction subsequent (younger) to the first branch processor instruction is routed to slot 240S5.

Turning now to FIG. 6, a method for operating an instruction decode unit is illustrated, according to one or more embodiments. Although the method illustrated in FIG. 6 may be described with reference to components shown in FIGS. 2-5F, it should be understood that this is merely for convenience and alternative components and/or configurations thereof can be employed with implementing one or more methods. In one or more embodiments, one or more portions of the method illustrated in FIG. 6 can be completed by microcode, one or more application-specific integrated circuits, and/or multiple logic gates.

The method of FIG. 6 begins at block 605 where instruction decode unit 200 receives processor instructions. For example, instruction decode unit 200 receives information from instruction cache 260. In one or more embodiments, the information from instruction cache 260 includes processor instruction data and pre-decode data. At block 610, instruction decode unit 200 groups two or more of the processor instructions into a group of processor instructions. In one or more embodiments, grouping the two or more of the processor instructions into the group of processor instructions includes removing the two or more processor instructions from two or more entries (e.g., two or more of entries 220B0-220B7) of instruction buffer 210 and routing the two or more processor instructions to two or more of slots 240S0-240S5. In one example, group control unit 245 can control two or more of MUXes 260M0-260M5 of group formation unit 230 to route the two or more processor instructions to two or more of slots 240S0-240S5. In a second example, routing the two or more processor instructions to two or more of slots 240S0-240S5 can include adding the two or more processor instructions to two or more of slots 240S0-240S5. In one or more embodiments, grouping the two or more processor instructions into the group of processor instructions can conclude after routing and/or adding a first branch instruction and a second branch instruction to slots 240S4 and 240S5. In one or more embodiments, grouping the two or more of the processor instructions into the group of processor instructions includes using the pre-decode data to determine the group of processor instructions. For example, group formation control 245 can use the pre-decode data to determine the group of processor instructions. In one or more embodiments, instruction decode unit 200 receives the processor instructions and groups the two or more of the processor instructions into the group of processor instructions in a clock cycle.

At block 615, instruction decode unit 200 stores the group of processor instructions. For example, the group of processor instructions can be stored in two or more of slots 240S0-240S5. For instance, slots 240S0-240S5 can be implemented with latches or registers. At block 620, instruction decode unit 200 conveys the group of processor instructions to two or more of decoders 240D0-240D5. For example, the group of program instruction from slots 240S0-240S5 is conveyed to decoders 240D0-240D5 when slots 240S0-240S5 receive a clock signal (e.g., a rising or falling edge of a clock signal). For instance, slots 240S0-240S5 can be actuated by the clock signal to convey the group of processor instructions to decoders 240D0-240D5. At block 625, instruction decode unit 200 conveys the decoded processor instructions to one or more issue queues 265 and/or a global completion table.

Turning now to FIG. 7, a method for operating an instruction decode unit is illustrated, according to one or more embodiments. Although the method illustrated in FIG. 7 may be described with reference to components shown in FIGS. 2-5F, it should be understood that this is merely for convenience and alternative components and/or configurations thereof can be employed with implementing one or more methods. In one or more embodiments, one or more portions of the method illustrated in FIG. 7 can be completed by microcode, one or more application-specific integrated circuits, and/or multiple logic gates, among others.

The method of FIG. 7 begins at block 700 where group formation control 245 starts a new group of processor instructions and proceeds to block 705 where group formation control 245 determines whether or not a processor instruction is valid. The processor instruction is the oldest instruction from buffer entries 220B0-220B7 that has not been routed to a slot. If the processor instruction is not valid, group formation control 245 proceeds to block 710 where a subsequent (younger) processor instruction can be prepared for examination and/or routing. If the processor instruction is valid, group formation control 245 proceeds to block 715 and determines whether or not the processor instruction is a processor instruction marked as "first" by pre-decode information or data associated with the processor instruction. In one or more embodiments, pre-decode information or data can mark a processor instruction as "first", and the mark or indication of the processor instruction as "first" indicates that the processor instruction is to be the first processor instruction in the group.

If the processor instruction is not marked to be the first processor instruction of the group, group formation control 245 proceeds to block 720 and determines whether the processor instruction is a branch processor instruction. If the processor instruction is not a branch processor instruction, group formation control 245 proceeds to block 725 and determines whether or not the processor instruction is a fifth non-branch processor instruction attempted to be added to the group. If the processor instruction is the fifth non-branch processor instruction attempted to be added to the group, group formation control 245 proceeds to block 755 and ends or concludes the group of processor instructions. Accordingly, group formation can conclude after four non-branch instructions are added to the group.

If the processor instruction is not the fifth processor instruction attempted to be added to the group, group formation control 245 proceeds to block 730 and determines whether or not the processor instruction is a processor instruction is marked as "last" by pre-decode information or data associated with the processor instruction. In one or more embodiments, pre-decode information can mark a processor instruction as "last", and the mark or indication of the processor instruction as "last" indicates that the processor instruction is to be the last processor instruction in the group. If processor instruction is to be the last processor instruction of the group, group formation control 245 proceeds to block 750, where the processor instruction is added to the group. If processor instruction is not to be the last processor instruction of the group, group formation control 245 proceeds to block 735, where the processor instruction is added to the group.

Referring to block 720, if the processor instruction is a branch instruction, group formation control 245 proceeds to block 740 and determines whether or not the processor instruction is a second branch processor instruction. If the processor instruction is a second branch processor instruction, group formation control 245 proceeds to block 750. If the processor instruction is not a second branch processor instruction, group formation control 245 proceeds to block 745 and determines whether or not the processor instruction is marked as a last processor instruction. If the processor instruction is to be the last processor instruction of the group, group formation control 245 proceeds to block 750. If the processor instruction is not to be the last processor instruction, group formation control 245 proceeds to block 735.

Referring to block 715, if the processor instruction is to be the first processor instruction of the group, group formation control 245 proceeds to block 760 and determines whether or not the processor instruction is a first valid processor instruction encountered in performing the method (e.g., the processor instruction is not marked or indicated as invalid by some data or metadata such as pre-decode data or information). If the processor instruction is not the first valid processor instruction encountered in performing the method, group formation control 245 proceeds to block 755. If the processor instruction is the first valid processor instruction encountered in performing the method, group formation control 245 proceeds to block 765 and determines whether or not a two-way split will be performed when the processor instruction is added to the group. If group formation control 245 determines that a two-way split will be performed when the processor instruction is added to the group, group formation control 245 proceeds to block 770 and determines whether or not the processor instruction is marked to be a last processor instruction of the group. If the processor instruction is marked to be a last processor instruction of the group, group formation control 245 proceeds to block 750. If the processor instruction is not marked to be a last processor instruction of the group, group formation control 245 proceeds to block 735.

Referring to block 765, if group formation control 245 determines that a two-way split will not be performed when the processor instruction is added to the group, group formation control 245 proceeds to block 775 and determines whether or not a four-way split will be performed when the processor instruction is added to the group. If a four-way split will not be performed when the processor instruction is added to the group, group formation control 245 proceeds to block 770. If a four-way split will be performed when the processor instruction is added to the group, group formation control 245 proceeds to block 750.

In adding the processor instruction to the group in blocks 735 or 750: if group formation control 245 determines that a two-way split will be performed when the processor instruction is added to the group, group formation control 245 routes the processor instruction to slots 240S0 and 240S1 when adding the processor instruction to the group; or if group formation control 245 determines that a four-way split will be performed when the processor instruction is added to the group, group formation control 245 routes the processor instruction to slots 240S0-240S3 when adding the processor instruction to the group. In one or more embodiments, group formation control 245 uses the pre-decode data associated with the processor instruction to perform one or more determinations of blocks 705, 720, 725, 730, 740, 745, 760, 765, 770, and 775. In one or more embodiments, the method illustrated in FIG. 7 can be performed in one clock cycle.

Turning now to FIG. 8, there is depicted a block diagram representation of a processor system, according to one or more embodiments. As is illustrated, a processor system 800 includes at least one chip-level multiprocessor (CMP) 802 (only one of which is illustrated in FIG. 8), each of which includes one or more processors 804A-804D (e.g., cores). As shown, each of processors 804A-804D can include a respective instruction decode unit of instruction decode units 200A-200D, and each of instruction decode units 200A-200D can include logic/functionality described with reference to instruction decode unit 200. In one or more embodiments, CMP 802 can correspond to a node (or a portion of a node) of a high performance computing (HPC) cluster.

Processors 804A-804D can, for example, operate in a simultaneous multithreading (SMT) mode or a single thread (ST) mode. When processors 804A-804D operate in the SMT mode, processors 804A-804D can employ multiple separate instruction fetch address registers to store program counters for multiple threads. In one or more embodiments, each of processors 804A-804D include a first level (L1) cache memory (not separately shown in FIG. 8) that is coupled to a shared second level (L2) cache memory (cache) 806, which is coupled to a shared third level (L3) cache 814 and a fabric controller 808.

As is illustrated, fabric controller 808 is coupled to a memory controller (e.g., included in a Northbridge) 810, which is coupled to a memory subsystem 812. For example, memory subsystem 812 can provide storage where data and/or processor instructions/code can be stored and/or retrieved. In some embodiments, memory subsystem 812 can include a random access memory and/or computer system memory such as DRAM, SRAM, EDO RAM, Rambus RAM, NVRAM, EPROM, EEPROM, flash memory, etc. Memory subsystem 812 can include other types of memory as well, or combinations thereof. Memory subsystem 812 includes an application appropriate amount of volatile and non-volatile memory.

In one or more embodiments, fabric controller 808 can be omitted and, in this case, the L2 cache 806 can be directly connected to main memory controller 810. Fabric controller 808, when implemented, can facilitate communication between different CMPs and between processors 804A-804D and memory subsystem 812 and can function as in interface in this manner.

It should be appreciated that the various techniques disclosed herein are equally applicable to systems that employ separate L2 caches for each of processors 804A-804D, as well as systems that employ separate L2 and L3 caches for each of processors 804A-804D. Each of the L1, L2, and L3 caches can be combined instruction and data caches or correspond to separate instruction and data caches. As is shown in FIG. 8, main memory controller 810 can also coupled to an I/O channel controller (e.g., included in a Southbridge) 816.

In one or more embodiments, I/O channel controller 816 can provide connectivity and control for one or more input devices and/or one or more output devices. In one example, the one or more input devices can include a pointing device (e.g., mouse) and/or a keyboard, among others. In another example, the one or more output devices can include a display, among others. Additionally, a multimedia drive (e.g., compact disk read/write (CDRW), digital video disk (DVD) drive, etc.) and/or an USB (universal serial bus) port can be coupled to I/O channel controller 816. The multimedia drive and the USB port enable insertion of a removable storage device (e.g., optical disk, "thumb" drive, etc.) on which data/instructions/code can be stored and/or from which data/instructions/code can be retrieved. Furthermore, I/O channel controller 816 can be coupled to various non-volatile memory such as a magnetic media, e.g., a hard drive, floppy drive, etc., where data/instructions/code can be stored and/or from where data/instructions/code can be retrieved. In one or more embodiments, I/O channel controller 816 can be coupled to a network interface (e.g., a wired network interface, a wireless network interface, etc.) that can be coupled to a network (e.g., a local area network, a wide area network, a public network such as an Internet, etc.).

In the flow charts above, one or more of the methods and/or processes are embodied in a computer readable medium including computer readable code such that a series of steps are performed when the computer readable code is executed (by a processing unit). In some implementations, certain processes of the methods and/or processes are combined, performed simultaneously, concurrently (e.g., scheduled quickly enough in time to appear simultaneous to a person), or in a different order, or perhaps omitted, without deviating from the spirit and scope of the invention. Thus, while the method(s) and/or process(es) are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, process, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", and/or "system." Furthermore, the present invention may take the form of an article of manufacture having a computer program product with a computer-usable storage medium having computer-executable program instructions/code embodied in or on the medium.

As will be farther appreciated, the method(s) and/or process(es) in embodiments of the present invention may be implemented using any combination of software, firmware, microcode, and/or hardware. As a preparatory step to practicing the invention in software, the programming code (whether software or firmware) will typically be stored in one or more machine readable storage mediums such as fixed hard) drives, diskettes, magnetic disks, optical disks, magnetic tape, semiconductor memories such as RAMS, ROMs, PROMs, EPROMs, EEPROMs, etc., thereby making an article of manufacture, in one or more embodiments. The medium may be electronic, magnetic, optical, electromagnetic, infrared, or semiconductor system (or apparatus or device) or a propagation medium. Further, the medium may be any apparatus that may include, store, communicate, propagate, or transport the program for use by or in connection with the execution system, apparatus, or device. The method(s) and/or process(es) disclosed herein may be practiced by combining one or more machine-readable storage devices including the code/logic according to the described embodiment(s) with appropriate processing hardware to execute and/or implement the code/logic included therein. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, use of the terms first, second, etc. can denote an order if specified, or the terms first, second, etc. can be used to distinguish one element from another without an ordered imposed.

What is claimed is:

1. A method for operating an instruction decode unit, the method comprising:

in an instruction decode unit of a processor:

receiving in an instruction buffer a plurality of processor instructions including multiple non-branch processor instructions and multiple branch processor instructions, wherein the plurality of instructions have a relative sequencing defined by a program order;

grouping at least first and second non-branch processor instructions and at least first and second branch processor instructions of the plurality of processor instructions into a group of processor instructions, wherein the first branch processor instruction is intermediate the first and second non-branch instructions in program order and wherein the group excludes a third non-branch processor instruction in the instruction buffer that is intermediate the first branch processor instruction and the second non-branch instruction in the program order; and conveying the group of processor instructions to at least one issue queue of the processor.

2. The method of claim 1, wherein said grouping is based at least on pre-decode information for the group of processor instructions.

3. The method of claim 1, further comprising:
before said conveying the group to the at least one issue queue, storing the group in a plurality of latches.

4. The method of claim 1, wherein said grouping is performed in a single clock cycle.

5. The method of claim 1, wherein said grouping includes adding each processor instruction of the group to the group and concluding the group after adding the first and second branch processor instructions to the group regardless of a number of the non-branch processor instructions within the group.

6. The method of claim 1, further comprising:
storing the plurality of processor instructions in the instruction buffer of the instruction decode unit;
wherein said grouping includes controlling a plurality of multiplexers, coupled to the instruction buffer, to select the at least two non-branch processor instructions and the at least two branch processor instructions from the instruction buffer.

7. The method of claim 1, wherein the first and second branch processor instructions are predicted as taken.

8. The method of claim 1, and further comprising:
invalidating the third non-branch processor instruction within the instruction buffer based on the third non-branch processor instruction having a memory address intermediate a fetch address of the first branch processor instruction and a target address of the first branch processor instruction.

9. The method of claim 1, wherein the grouping includes ordering the at least two non-branch processor instructions in the plurality of slots in accordance with the program order and placing the at least two branch processor instructions in the plurality of slots out of order with respect to the program order.

10. An instruction decode unit for a processor, the instruction decode unit comprising:
an instruction buffer operable to store a plurality of processor instructions received from an instruction cache, wherein the plurality of instructions have a relative sequencing defined by a program order;
a set of latches including a first plurality of latches operable to store non-branch processor instructions and a second plurality of latches operable to store branch processor instructions;
a group formation unit coupled between the instruction buffer and the first and second pluralities of latches, wherein the group formation unit forms at least first and second non-branch processor instructions of the plurality of processor instructions in the instruction buffer and at least first and second branch processor instructions of the plurality of processor instructions in the instruction buffer into a group of processor instructions in the set of latches for subsequent issue, wherein the first branch processor instruction is intermediate the first and second non-branch instructions in program order and wherein the group excludes a third non-branch processor instruction in the instruction buffer that is intermediate the first branch processor instruction and the second non-branch instruction in the program order.

11. The instruction decode unit of claim 10, wherein:
the instruction decode unit is operable to be coupled to at least one instruction issue queue; and
the instruction decode unit further includes logic that conveys the group of processor instructions from the set of latches to the at least one instruction issue queue.

12. The instruction decode unit of claim 11, wherein the logic comprises:
a first plurality of decoders coupled to the first plurality of latches, the first plurality of decoders being operable to decode at least non-branch processor instructions and to convey at least non-branch decode information to the at least one instruction issue queue; and
a second plurality of decoders coupled to the second plurality of latches, the second plurality of decoders being operable to decode at least branch processor instructions and to convey at least branch decode information to the at least one instruction issue queue.

13. The instruction decode unit of claim 10, wherein said group formation unit forms the group of processor instruction in the set of latches in a single clock cycle.

14. The instruction decode unit of claim 10, wherein said group formation unit concludes the group after adding the first and second branch processor instructions to the group regardless of a number of the non-branch processor instructions within the group.

15. The instruction decode unit of claim 10, wherein:
the group formation unit includes a plurality of multiplexers, coupled to the instruction buffer, that select the first and second non-branch processor instructions and the first and second branch processor instructions from the instruction buffer for inclusion in the group.

16. The instruction decode unit of claim 10, wherein:
the first plurality of latches is operable to only store non-branch processor instructions; and
the second plurality of latches is operable to store only branch processor instructions.

17. The instruction decode unit of claim 10, wherein the first and second branch processor instructions are predicted as taken.

18. The instruction decode unit of claim 10, wherein the instruction decode unit invalidates the third non-branch processor instruction within the instruction buffer based on the third non-branch processor instruction having a memory address intermediate a fetch address of the first branch processor instruction and a target address of the first branch processor instruction.

19. The instruction decode unit of claim 10, wherein the group formation unit orders the at least first and second non-branch processor instructions in the set of latches in accordance with the program order of the at least first and second non-branch processor instructions and places the at least two branch processor instructions in the set of latches out of order with respect to the program order.

20. The instruction decode unit of claim 10, wherein the group formation unit forms the group of processor instructions based at least on pre-decode information for the group of processor instructions.

21. A processor system, comprising:
   a memory; and
   at least one superscalar processor coupled to the memory, wherein the at least one superscalar processor includes:
      an instruction cache;
      execution resources; and
      an instruction decode unit coupled between the instruction cache and the execution resources, wherein the instruction decode unit includes:
         an instruction buffer operable to store a plurality of processor instructions received from an instruction cache, wherein the plurality of instructions have a relative sequencing defined by a program order;
         a set of latches including a first plurality of latches operable to store non-branch processor instructions and a second plurality of latches operable to store branch processor instructions;
         a group formation unit coupled between the instruction buffer and the first and second pluralities of latches, wherein the group formation unit forms at least first and second non-branch processor instructions of the plurality of processor instructions in the instruction buffer and at least first and second branch processor instructions of the plurality of processor instructions in the instruction buffer into a group of processor instructions in the set of latches for subsequent issue, wherein the first branch processor instruction is intermediate the first and second non-branch instructions in program order and wherein the group excludes a third non-branch processor instruction in the instruction buffer that is intermediate the first branch processor instruction and the second non-branch instruction in the program order.

22. The processor system of claim 21, wherein:
   the instruction decode unit is operable to be coupled to at least one instruction issue queue; and
   the instruction decode unit further includes logic that conveys the group of processor instructions from the set of latches to the at least one instruction issue queue.

23. The processor system of claim 21, wherein the logic; comprises:
   a first plurality of decoders coupled to the first plurality of latches, the first plurality of decoders being operable to decode at least non-branch processor instructions and to convey at least non-branch decode information to the at least one instruction issue queue; and
   a second plurality of decoders coupled to the second plurality of latches, the second plurality of decoders being operable to decode at least branch processor instructions and to convey at least branch decode information to the at least one instruction issue queue.

24. The processor system of claim 21, wherein said group formation unit forms the group of processor instruction in the set of latches in a single clock cycle.

25. The processor system of claim 21, wherein said group formation unit concludes the group after adding the first and second branch processor instructions to the group regardless of a number of the non-branch processor instructions within the group.

26. The processor system of claim 21, wherein:
   the first plurality of latches is operable to only store non-branch processor instructions; and
   the second plurality of latches is operable to store only branch processor instructions.

27. The processor system of claim 21, wherein the first and second branch processor instructions are predicted as taken.

28. The processor system of claim 21, wherein the instruction decode unit invalidates the third non-branch processor instruction within the instruction buffer based on the third non-branch processor instruction having a memory address intermediate a fetch address of the first branch processor instruction and a target address of the first branch processor instruction.

29. The processor system of claim 21, wherein the group formation unit orders the at least first and second non-branch processor instructions in the set of latches in accordance with the program order of the at least first and second non-branch processor instructions and places the at least two branch processor instructions in the set of latches out of order with respect to the program order.

30. The processor system of claim 21, wherein the group formation unit forms the group of processor instructions based at least on pre-decode information for the group of processor instructions.

\* \* \* \* \*